United States Patent
Nasir et al.

(10) Patent No.: US 8,732,801 B2
(45) Date of Patent: May 20, 2014

(54) WIRELESS CONNECTION METHOD AND DEVICE

(75) Inventors: Azim Nasir, Foxboro, MA (US); Afshin Moshrefi, Newburyport, MA (US); Hong (Jeff) Xiao, Acton, MA (US); Nader Gharachorloo, Ossining, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 90 days.

(21) Appl. No.: 13/315,921

(22) Filed: Dec. 9, 2011

(65) Prior Publication Data

US 2013/0152168 A1    Jun. 13, 2013

(51) Int. Cl.
*G06F 7/04*          (2006.01)
(52) U.S. Cl.
USPC ............................................... 726/4; 380/270
(58) Field of Classification Search
USPC ............ 726/4, 5, 7; 713/168; 370/338; 455/426.1; 380/247, 270
See application file for complete search history.

(56) References Cited

U.S. PATENT DOCUMENTS

| | | | |
|---|---|---|---|
| 7,305,245 B2 * | 12/2007 | Alizadeh-Shabdiz et al. | 455/456.6 |
| 8,488,574 B2 * | 7/2013 | Kim et al. | 370/338 |
| 2004/0028017 A1 * | 2/2004 | Whitehill et al. | 370/338 |
| 2009/0213819 A1 * | 8/2009 | Kalhan | 370/338 |
| 2010/0031334 A1 * | 2/2010 | Shaikh | 726/7 |
| 2010/0052988 A1 * | 3/2010 | Chou et al. | 342/374 |
| 2010/0066839 A1 * | 3/2010 | Azuma et al. | 348/207.1 |
| 2010/0289646 A1 * | 11/2010 | Raniere | 340/572.1 |
| 2011/0154447 A1 * | 6/2011 | Dennis et al. | 726/4 |
| 2011/0269456 A1 * | 11/2011 | Krishnaswamy et al. | 455/426.1 |

* cited by examiner

*Primary Examiner* — Samson Lemma

(57) ABSTRACT

A method, a device, and an access point are provided for obtaining network access. A method, comprising: receiving, by an access point device and from wireless device, a request for authorization to access a network through the access point; determining, by the access point, a distance between the access point and the wireless device; determining, by the access point, that the distance is less than a first threshold distance; using, by the access point, a first process to grant access to the network through the access point when the distance is less than the first threshold distance; and using, by the access point, a second process to grant access to the network through the access point when the distance is not less than the first threshold distance, where the first process is a different and less complex for granting access to the network than the second process.

16 Claims, 14 Drawing Sheets

WIRELESS CONNECTION METHOD AND DEVICE

BACKGROUND

Wireless access points have become fairly common in many households. However, many of these households have problems with setting up their access points properly. Problems with setting up access points can stem from a lack of experience with using service set identifiers (SSID), encrypted passwords (e.g., Wired Equivalent Privacy (WEP), Wi-Fi Protected Access (WPA), etc.), and other technical features (e.g., ports, firewalls, etc.).

DETAILED DESCRIPTION OF PREFERRED EMBODIMENTS

The following detailed description refers to the accompanying drawings. The same reference numbers in different drawings may identify the same or similar elements.

Figure 1B:
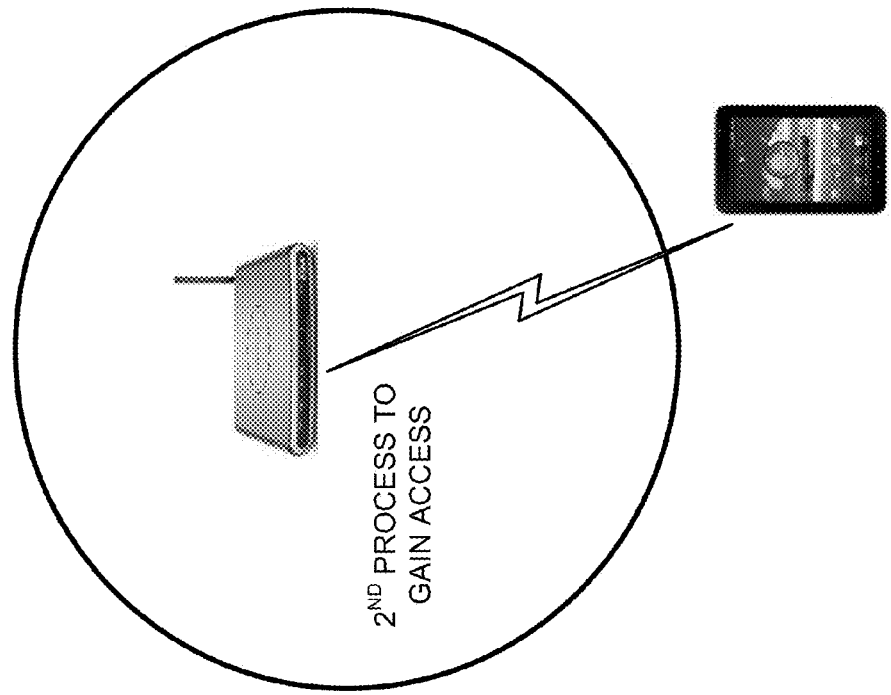
FIG. 1 is a diagram of an overview of an implementation described herein.
Figure 1A:
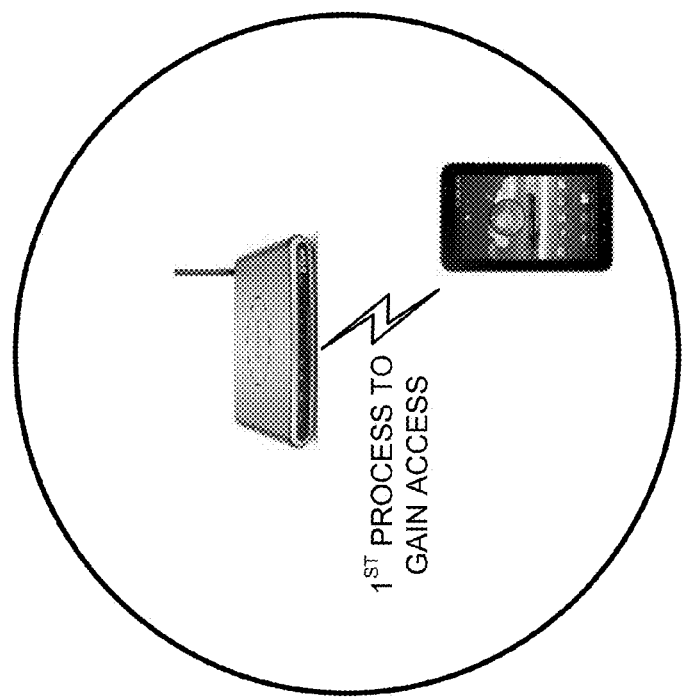

FIGS. 1A and 1B are diagrams of overviews of implementations described herein. A user of a wireless device may use the wireless device to request and obtain content from a network through a wireless access point; however, accessing the network through a wireless access point can be cumbersome. For example, prompts requiring SSID (Service Set Identifier), WEP/WPA passwords, etc. can make connecting wireless devices difficult if this information is not known or understood.

As illustrated in FIG. 1A, a first process for granting access to a network can be provided by bringing a wireless device within a predetermined distance from an access point. In one implementation, a wireless device can be granted unrestricted access to a network without logging into the access point when the wireless device is brought within one meter from an access point.

As illustrated in FIG. 1B, a second process for granting access to a network can be provided through a series of questions in combination with a predetermined distance. In one implementation, when a wireless device is brought to outside the predetermined distance from an access point, the access point can provide questions, which when answered correctly can lead to granting access to the network. As illustrated herein, the first process can be less cumbersome than the second process because access can be granted by bringing the wireless distance within the predetermined distance without having to answer the series of questions, for example.

As illustrated in FIGS. 1A and 1B, accessing a network through an access point can be made less complex and cumbersome by bringing a wireless device within a predetermined distance of the access point. The first process described in conjunction with FIG. 1A can be less complex and less cumbersome than the second process described in conjunction with FIG. 1B, but both processes would provide relatively simple access to a network through an access point.

Implementations of methods and devices to assist a wireless device with granting access to an access point by bringing the wireless device within a predetermined physical proximity (e.g., within a threshold distance) for authorization to the access point, are provided. Additionally, security features can also be implemented. By providing a physical proximity mechanism for network access, manual entry of information, such as SSID and WEP/WPA passwords, can be bypassed while security can be maintained.

Figure 2:
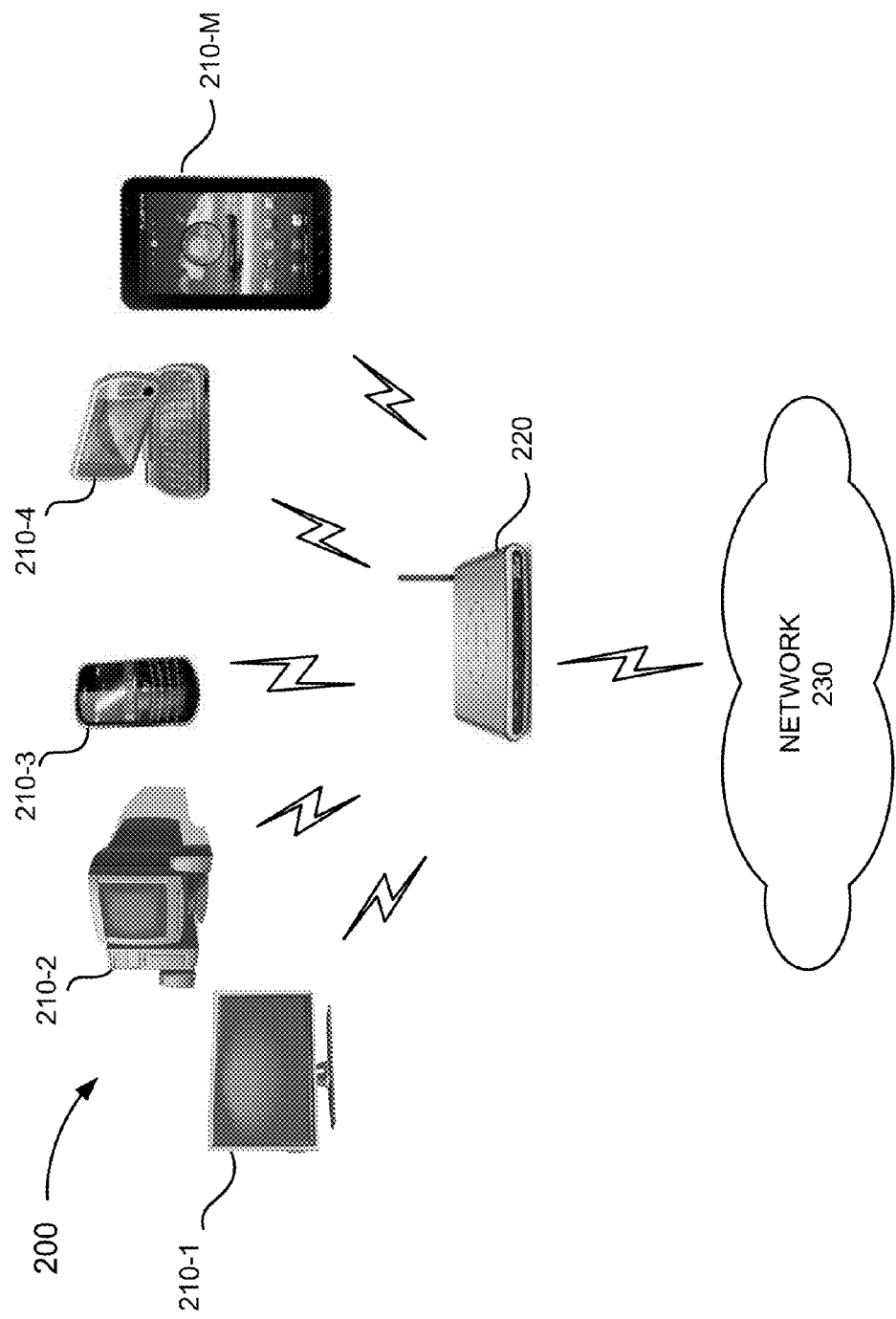
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include wireless devices 210-1, 210-2, 210-3, 210-4, ..., 210-M (where M≥1) (collectively referred to as "wireless devices 210," and individually as "wireless device 210"); access point 220; and network 230.

Wireless device 210 may include any portable device capable of communicating wirelessly with network 230. For example, wireless device 210 may correspond to a mobile communication device (e.g., a mobile phone or a personal digital assistant (PDA)), a portable computer device (e.g., a laptop or a tablet computer), a stationary device (e.g., a desktop with a wireless adapter, a set top box, or a network streaming player), or another type of wireless network-capable device.

Access point 220 may include any network device that can forward data packets between computer networks. Access point 220 can be a router, modem, bridge, hub, or other type of network device that acts as a wireless access point. Access point 220 may include any network device that can forward data packets between computer networks. For example, access point 220 can forward data, such as web pages and email, between a wireless device 210 and a network 230. In one implementation, access point 220 can include software that can enable access point 220 to communicate with wireless device 210 and request that a user of wireless device 210 enter information, such as SSID, password, etc. to grant access to network 230.

Additionally, access point 220 can measure proximity (e.g., a measurable distance) between access point 220 and wireless device 210. For example, access point 220 can transmit and receive radio signals, where radio signal strength from wireless device 210 can correspond to a distance between access point 220 and wireless device 210. Additionally, access point 220 can send messages to wireless device 210 for displaying to a user of wireless device 210. For example, if access point 220 measures that wireless device 210 is located within a threshold distance of access point 220, then access point 220 can cause wireless device 210 to provide an interactive field to a user of wireless device 210.

Network 230 may include any network or combination of networks. In one implementation, network 230 may include a local area network (LAN), such as a wireless LAN (WLAN) (e.g., IEEE 802.11 standards for implementing WLAN at 2.4, 3.6 and 5 GHz frequency bands, 802.11 a/b/g/n), a wide area network (WAN) (e.g., the internet), a metropolitan area network (MAN), an ad hoc network, a telephone network (e.g., a Public Switched Telephone Network (PSTN), or a voice-over-IP (VoIP) network), or a combination of networks.

Figure 3:
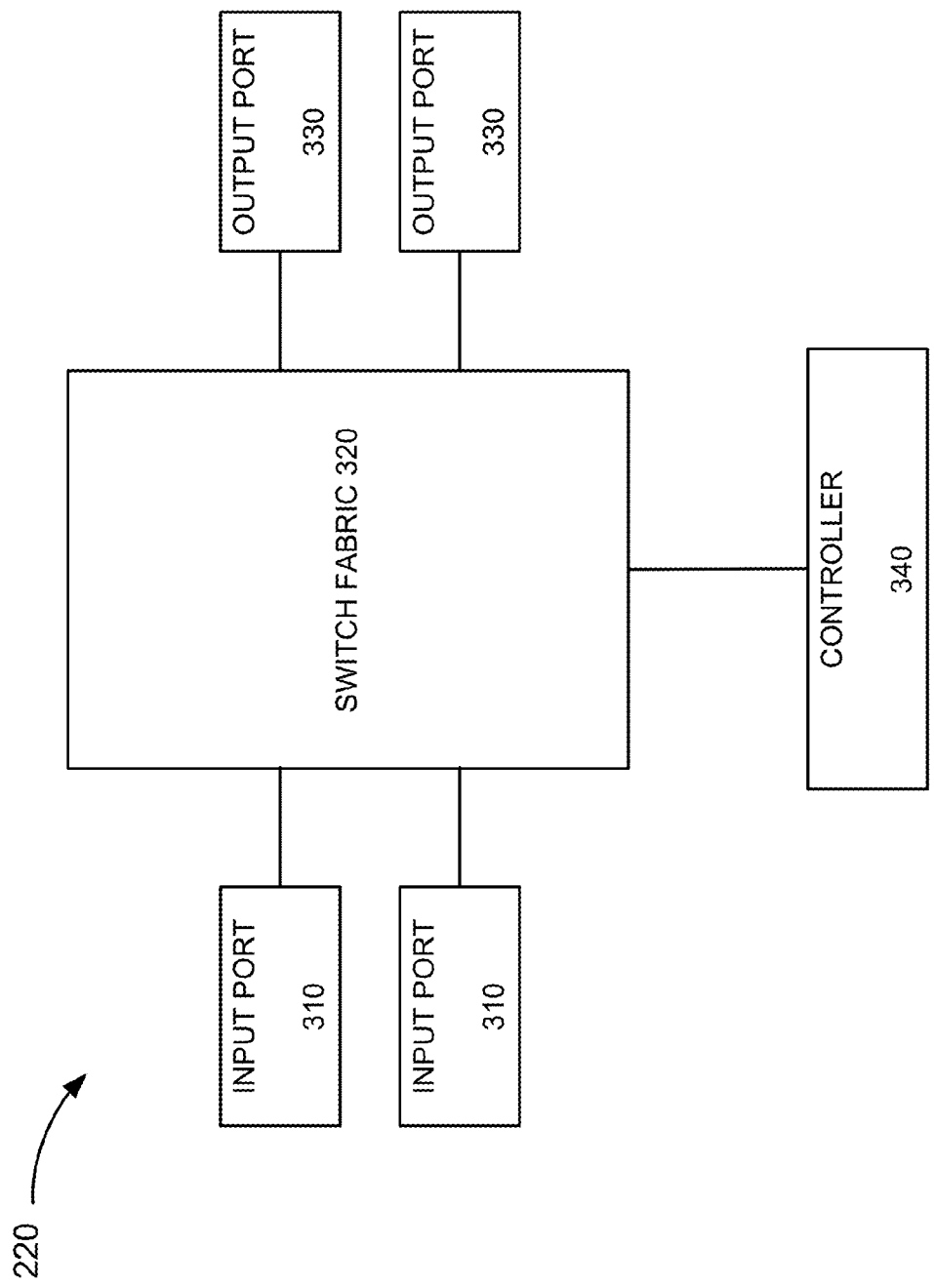
FIG. 3 is a diagram of example components of a device that may be used within the environment of FIG. 2.

FIG. 3 is a diagram of example components of access point 220. Access point 220 may include one or more input ports 310, switch fabric 320, one or more output ports 330, and controller 340.

Input ports 310 may be a point of entry for incoming traffic, such as data packets. Input ports 310 may process incoming wired or wireless traffic.

Switch fabric 320 may interconnect input ports 310 with output ports 330. Switch fabric 320 may act as temporary buffers to store traffic from input ports 310 before the traffic is eventually scheduled for delivery to output ports 330.

Output ports 330 may store packets and may schedule packets for service on output links. Output ports 330 may process outgoing wired or wireless traffic.

Controller 340 may use routing protocols and/or one or more forwarding tables for forwarding packets. Controller 340 may connect with input ports 310, switch fabric 320, and output ports 330. Controller 340 may include memory to store information, such as information entered during set up (e.g., passwords, questions, answers, etc.). Controller 340 may include a processor that can determine a distance based upon radio signal strength, can compare the distance with preset distances, and can compare data with data in memory (e.g., passwords, questions, answers, etc.). Controller 340 may include an access component that provides access to network 230 based upon signals provided by the processor. Controller 340 may compute a forwarding table, implement routing protocols, and/or execute software to configure and manage access point 220. Controller 340 may determine routing for any packet whose destination address may not be found in the forwarding table.

Although FIG. 3 shows example components of access point 220, in other implementations, access point 220 may include fewer components, different components, differently arranged components, or additional components than depicted in FIG. 3. Alternatively, or additionally, one or more components of access point 220 may perform one or more other tasks described as being performed by one or more other components of access point 220.

Figure 4:
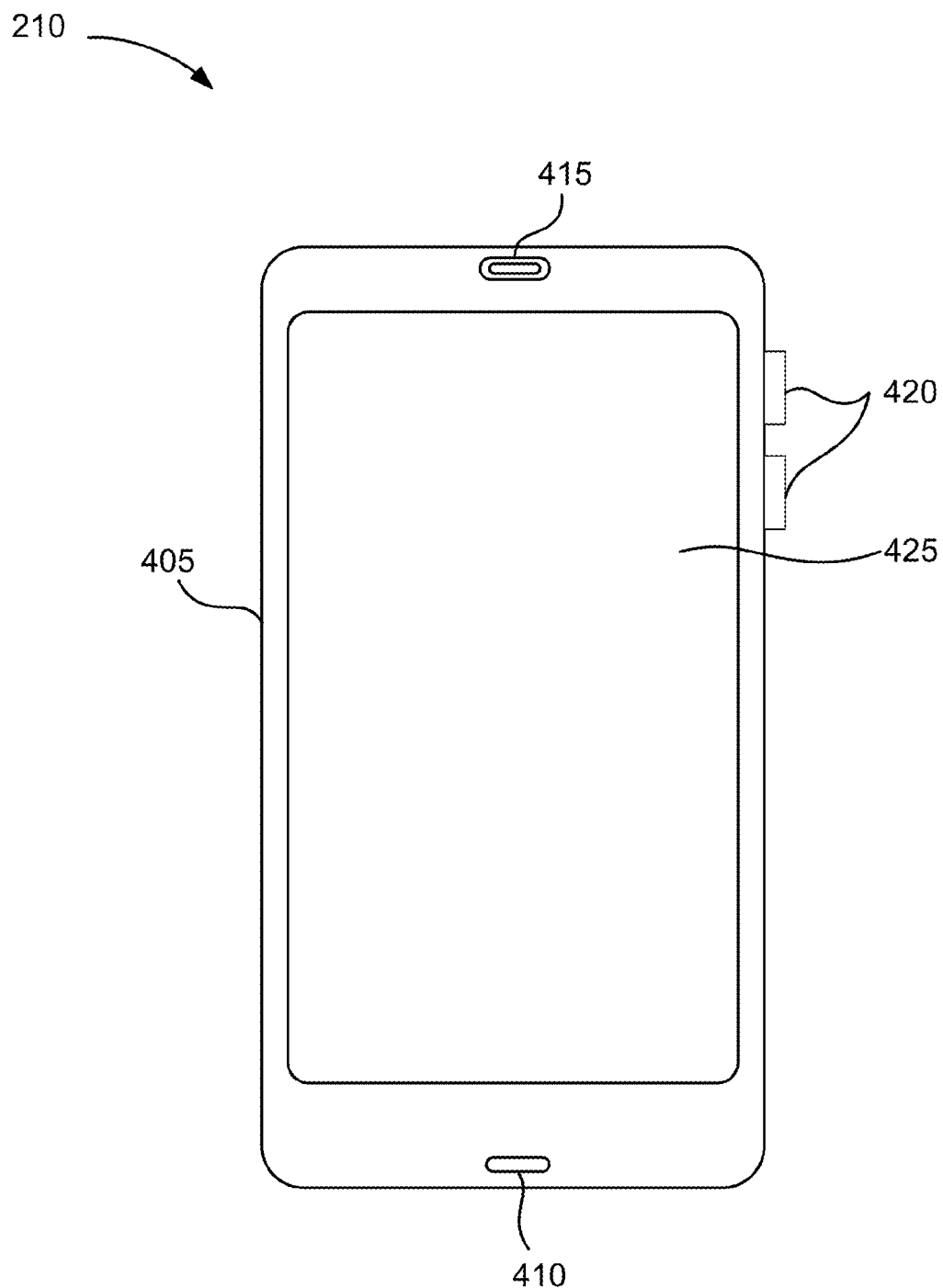
FIG. 4 is a diagram of an example wireless device of FIG. 2.

FIG. 4 is a diagram of an example implementation of wireless device 210. In the implementation shown in FIG. 4, wireless device 210 may correspond to a mobile communication device or any other device capable of connecting to a network wirelessly. Wireless device 210 may include a housing 405, a microphone 410, a speaker 415, buttons 420, and a display 425. In other implementations, wireless device 210 may include fewer, additional, different, or differently arranged components than those illustrated in FIG. 4 and described herein. For example, a keypad or other input device may be implemented on a touch screen of display 425 or on buttons 420.

Housing 405 may include a structure to contain components of wireless device 210. For example, housing 405 may be formed from plastic, metal, or some other material. Housing 405 may support microphone 410, speaker 415, buttons 420, and display 425.

Microphone 410 may include an input device that converts a sound wave to a corresponding electrical signal. For example, the user may speak into microphone 410 during a telephone call or to execute a voice command.

Speaker 415 may include an output device that converts an electrical signal to a corresponding sound wave. For example, the user may listen to music, listen to a calling party, or listen to other auditory signals through speaker 415.

Buttons 420 may include an input device that provides input into wireless device 210. Buttons 420 may include an input component to wireless device 210 to enter information, such as to access a camera feature, to access data, or to invoke a function or an operation. Buttons 420 can be implemented as physical keys on housing 405 or display 425, or virtual keys on a touch screen of display 425.

Display 425 may include an output device that outputs visual content, and/or may include an input device that receives user input (e.g., a touch screen (also known as a touch display)). Display 425 may be implemented according to a variety of display technologies, including but not limited to, a liquid crystal display (LCD), a plasma display panel (PDP), a field emission display (FED), a thin film transistor (TFT) display, a light emitting diode (LED) display, an organic light emitting diode (OLED) display, or some other type of display technology. Additionally, display 425 may be implemented according to a variety of sensing technologies, including but not limited to, capacitive sensing, surface acoustic wave sensing, resistive sensing, optical sensing, pressure sensing, infrared sensing, gesture sensing, etc. Display 425 may be implemented as a single-point input device (e.g., capable of sensing a single touch or point of contact) or a multipoint input device (e.g., capable of sensing multiple touches or points of contact that occur at substantially the same time).

Figure 5:
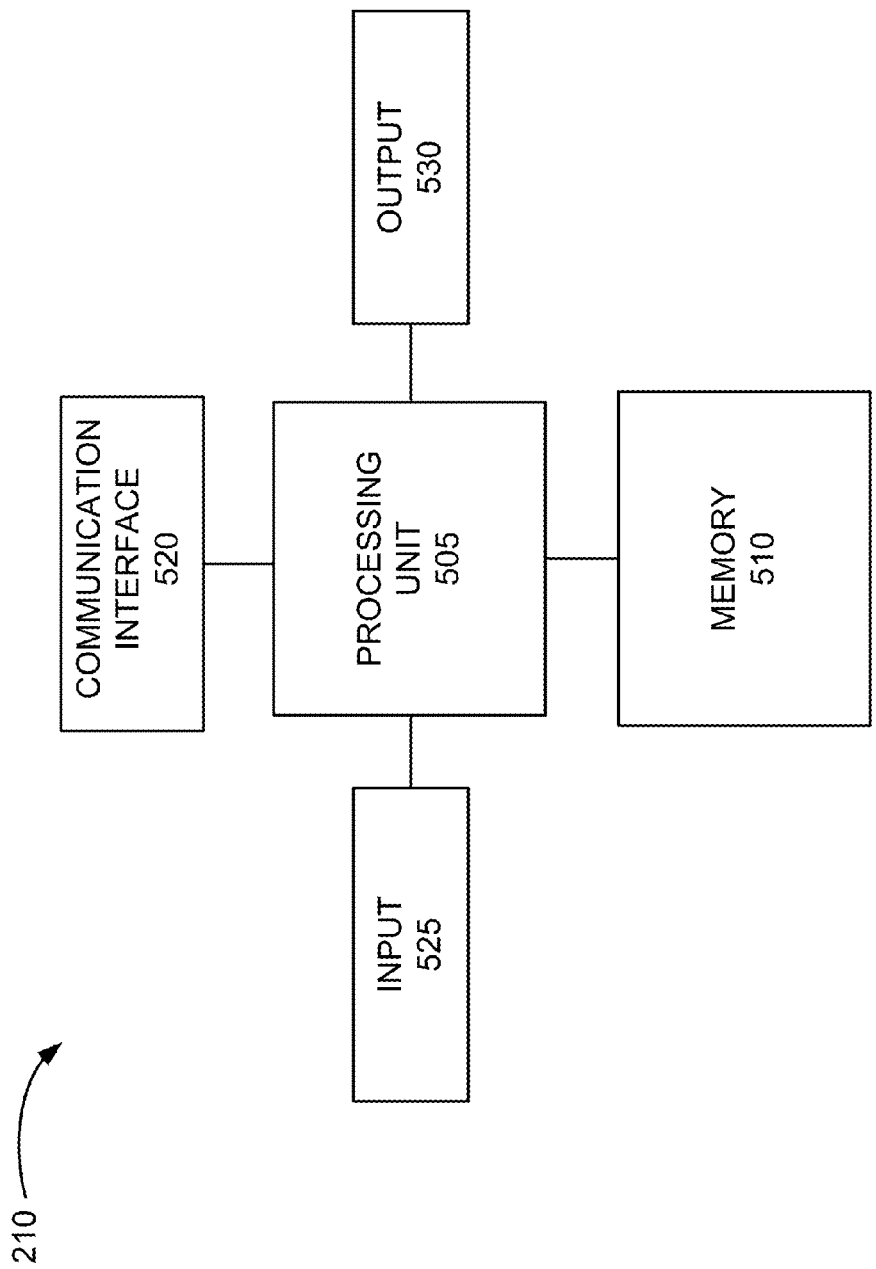
FIG. 5 is a diagram of example components of the wireless device of FIG. 4.

FIG. 5 is a diagram illustrating example components of wireless device 210. As illustrated, wireless device 210 may include a processing unit 505, a memory 510, a communication interface 520, an input component 525, and an output component 530. In another implementation, wireless device 210 may include fewer, additional, different, or differently arranged components than those illustrated in FIG. 5. Additionally, in other implementations, a function described as being performed by a particular component of wireless device 210 may be performed by a different component of wireless device 210.

Processing unit 505 may include one or more processors, microprocessors, data processors, co-processors, network processors, ASICs, controllers, programmable logic devices (PLDs), chipsets, FPGAs, or other components that may interpret or execute instructions or data. Processing unit 505 may control the overall operation, or a portion thereof, of wireless device 210, based on, for example, an operating system (not illustrated) and/or various applications. Processing unit 505 may access instructions from memory 510, from other components of wireless device 210, or from a source external to wireless device 210 (e.g., a network or another device).

Memory 510 may include memory or secondary storage. For example, memory 510 may include a RAM, a dynamic RAM (DRAM), a ROM, a programmable ROM (PROM), a flash memory, or some other type of memory. Memory 510 may include a hard disk (e.g., a magnetic disk, an optical disk, a magneto-optic disk, a solid state disk, etc.) or some other type of computer-readable medium, along with a corresponding drive. Memory 510 may store data, applications, or instructions related to the operation of wireless device 210. For example, memory 510 may include a variety of applications, such as a wireless network access application, a navigation application, an e-mail application, a telephone application, a camera application, a voice recognition application, a multi-media application, a music player application, a visual voicemail application, a contacts application, a data organizer application, a calendar application, an instant messaging application, a texting application, a web browsing application, a blogging application, or other types of applications (e.g., a word processing application, a spreadsheet application, etc.). As described above, the video content application may permit a user to find video content of interest; purchase, rent, or subscribe to the video content; or play the video content.

Communication interface 520 may include a component that permits wireless device 210 to communicate with other devices (e.g., access point 220) or networks (e.g., network 230). For example, communication interface 520 may include some type of wireless or wired interface. Communication interface 520 may also include an antenna (or a set of antennas) that permit wireless communication, such as the transmission and reception of radio frequency (RF) signals.

Input component 525 may include a component that permits a user or another device to input information into wireless device 210. For example, input component 525 may include a receiver, a keypad, buttons (e.g., buttons 420), a switch, a knob, fingerprint recognition logic, retinal scan logic, a web cam, voice recognition logic, a touchpad, an input port, a microphone (e.g., microphone 410), a display (e.g., display 425), or some other type of input component. Output component 530 may include a component that permits wireless device 210 to output information to the user or another device. For example, output component 530 may include a transmitter, a display (e.g., display 425), LEDs, an output port, a speaker (e.g., speaker 415), or some other type of output component.

As described herein, wireless device 210 may perform certain operations in response to processing unit 505 executing software instructions contained in a computer-readable medium, such as memory 510. The software instructions may be read into memory 510 from another computer-readable medium or from another device via communication interface 520. The software instructions contained in memory 510 may cause processing unit 505 to perform processes described herein. Alternatively, hardwired circuitry may be used in place of or in combination with software instructions to implement processes described herein. Thus, implementations described herein are not limited to any specific combination of hardware circuitry and software.

Figure 6:
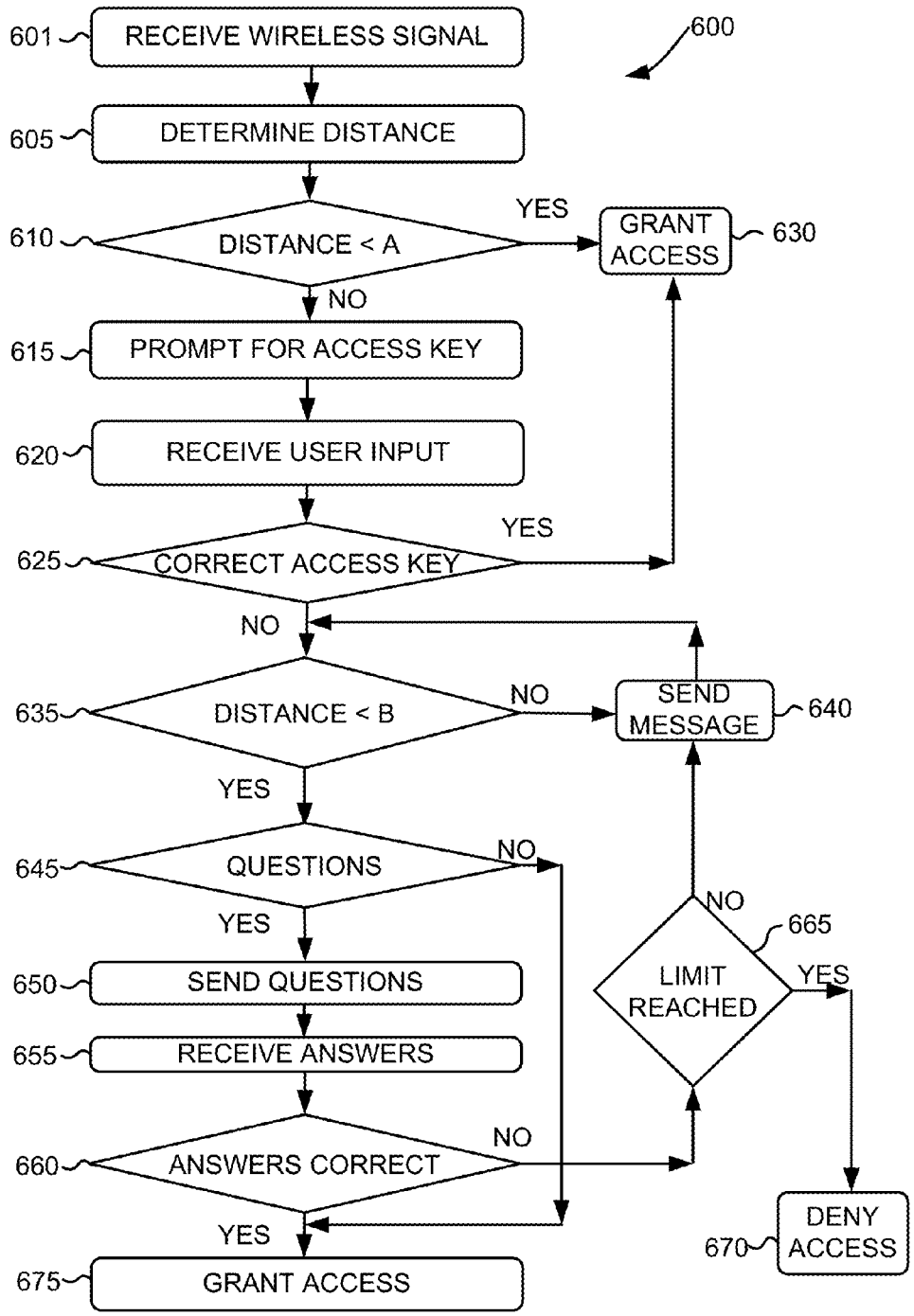
FIG. 6 is a flowchart of an example process implementation.

FIG. 6 is a flowchart of an example process 600 for granting access to network 230. In one implementation, process 600 may be performed by one or more components of access point 220 and/or wireless device 210, such as input ports 310, switch fabric 320, output ports 330, or controller 340 of access point 220 or input component 525, output component 530, or processing unit 505 of wireless device 210. Process 600 will be described with corresponding references to examples illustrated in FIGS. 7-14.

Process 600 may include receiving a wireless signal that can initiate process 600 (block 601). In one implementation, a user of wireless device 210 may activate a wireless network access application, such as by selecting an icon (or another type of identifier) associated with the wireless network access application. In another implementation, wireless device 210 may automatically activate a wireless network access application, where access point 220 can receive a signal from wireless device 210. In another implementation, access point 220 may be engaged by wireless device 210 searching for a wireless network connection, where access point 220 can receive a signal from wireless device 210. For example, wireless device 210 may engage access point 220 by sending a signal requesting access to network 230 from access point 220, and this signal may be received by access point 220.

Process 600 may include determining a distance between wireless device 210 and access point 220 (block 605). In one implementation, access point 220 could measure a distance between access point 220 and wireless device 210. For example, radio signals from wireless device 210 can be received by access point 220, and based on the strength of the radio signals received by access point 220, the distance between wireless device 210 and access point 220 can be determined. For example, an algorithm or other conversion method can be used to convert signal strength to distance. In one implementation, access point 220 includes software that allows access point 220 to measure the distance between access point 220 and wireless device 210, and then allows access point 220 to implement steps based upon the distance. Additionally, or alternatively, as another example, access point 220 could ping wireless device 210 at a first time t1, then access point 220 could receive a return ping at a second time t2, and then access point 220 could measure the distance between access point 220 and wireless device 210 based upon the difference in time between the first time t1 and the second time t2.

Process 600 may include determining whether the distance between wireless device 210 and access point 220 is less than a first threshold distance "A" (block 610). In one implementation, the first threshold distance "A" can be a predetermined distance, such as one or more meters. If the distance between wireless device 210 and access point 220 is less than this distance, access can be allowed without further interaction between wireless device 210 and access point 220, or interaction by a user of wireless device 210. For example, the first threshold distance "A" can be a distance of one meter, where network access can be granted when wireless device 210 is brought within the first threshold distance "A" from access point 220. In one implementation, a processor of access point 220 can be used to calculate the distance between wireless device 210 and access point 220, and also compare the distance to a threshold distance, such as first threshold distance "A."

Figure 7:
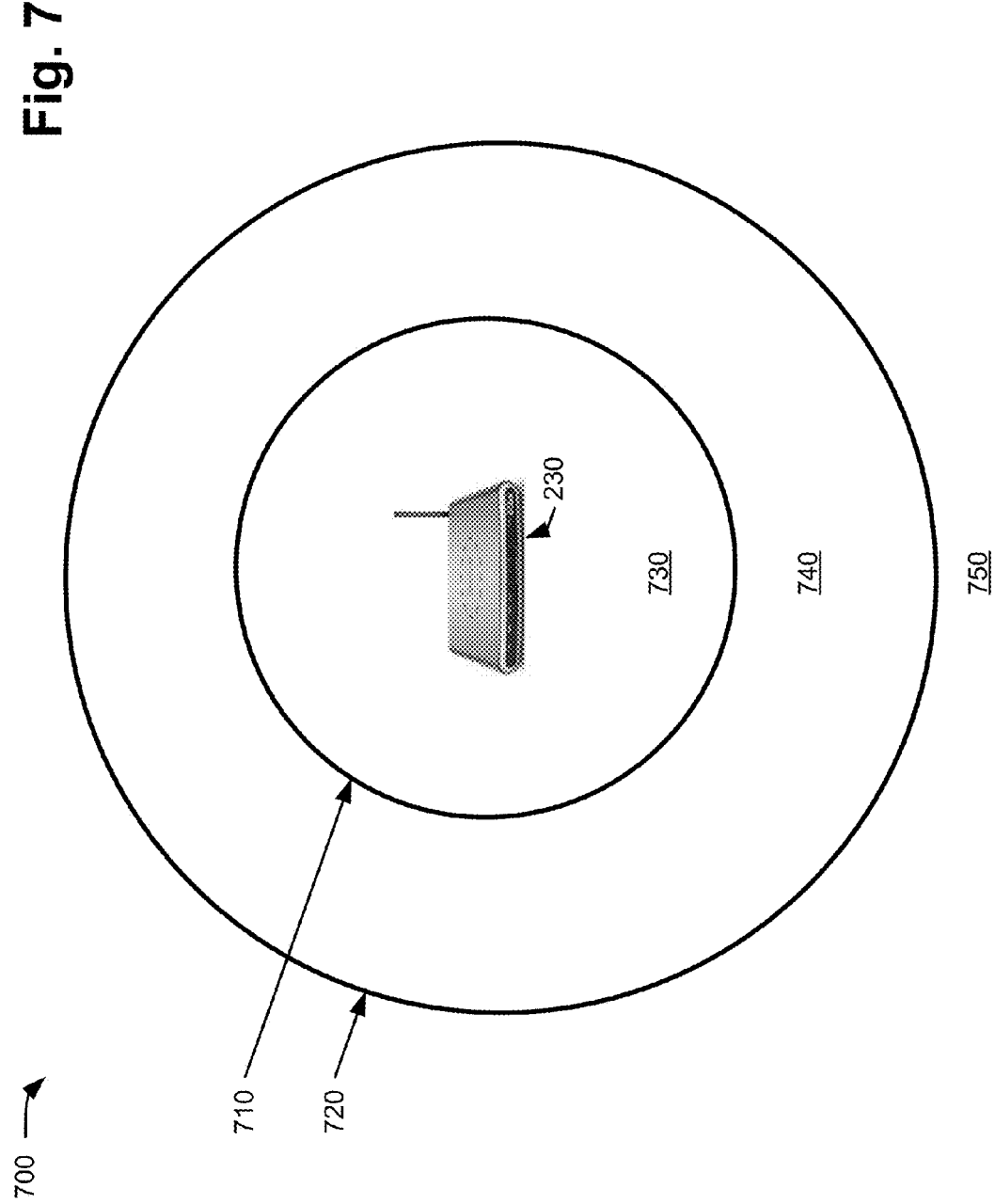
FIG. 7 is a diagram that illustrates an example implementation of threshold distances around an access point.

In one implementation, as illustrated in FIG. 7, a first threshold distance 710 can be closer to access point 220 than a second threshold distance 720. In one implementation, a first area 730 inside the first threshold distance 710 can be used to provide a first process to grant access to network 230, a second area 740 between the first threshold distance 710 and the second threshold distance 720 can be used to provide a second process to grant access to network 230, and a third area 750 outside the second threshold distance 720 can be used to provide a third process to grant access to network 230. While three areas are described, there could be fewer (e.g., 1 or 2 areas) or more (e.g., greater than 3 areas) areas that could be used for granting access to network 230.

In one implementation, the first process to grant access to network 230 can be less complex than the second process to grant access to network 230 and the second process to grant access to network 230 can be less complex than the third process to grant access to network 230. A process can be less complex because it requires fewer steps, fewer technical inputs, less interaction between the access point and the wireless device, less interaction between a user of the wireless device and the wireless device, and/or can be less time consuming. For example, the first process to grant access to network 230 can be less complex by not requiring the user of wireless device 210 to answer questions that may be required for the second process to grant access to network 230. As another example, the second process to grant access to network 230 can be less complex by not requiring technical features, such as a SSID, WEP password, etc. that may be required for the third process to grant access to network 230.

In one implementation, if wireless device 210 is brought inside the first area 730 within the first threshold distance 710, the first process to grant access to network 230 can include temporary or permanent unlimited access to network 230. Due to the proximity of wireless device 210 from access point 220, temporary or permanent unlimited access to network 230 without a password or any other security measure can be allowed. For example, a user can bring wireless device 210 within one meter from access point 220 and access can be granted. Additionally or alternatively, if wireless device 210 is brought inside the second area 740 within the second threshold distance 720, but outside the first area 730 and the first threshold distance 710, the second process to grant access to network 230 can include temporary unlimited or limited access to network 230 or can require questions to be answered correctly in order for access to network 230 to be granted. For example, a user can bring wireless device 210 to five meters from access point 220 and questions can be asked with access granted if correct answers are provided.

Additionally or alternatively, in one implementation, if wireless device 210 is brought inside the third area 750 outside the second threshold distance 720, but still within range of access point 220, then the third process to grant access to network 230 can include providing temporary limited access and/or a message for wireless device 210. For example, a user can bring wireless device 210 within ten meters of access point 220 and temporary downloading can be allowed along with a message sent from access point 220 to wireless device 210 requesting an access key or requesting that wireless device 210 be brought closer to access point 220 to grant full access.

Process 600 may grant access to network 230 (block 630), if the distance determined is less than the first threshold distance 710 of "A" (block 610—YES) In one implementation, if wireless device 210 is within the first threshold distance 710, access to network 230 can be granted either temporarily or permanently without user interaction. In one example implementation, access can be granted for the duration that wireless device 210 is within the first threshold distance 710 or access can be granted for any time duration after wireless device 210 entered within first threshold distance 710. For example, if wireless device 210 is brought within one meter of access point 220, 24 hours of network access through access point 220 could be immediately given to wireless device 210.

Process 600 may include prompting for an access key (block 615) if the distance determined is not less than the first threshold distance 710 of "A" (block 610—NO). In one implementation, access point 220 may send a signal to wireless device 210 to display a prompt requesting an access key, such as the MAC address, SSID, password, etc. For example, wireless device 210 can ask a user of wireless device 210 to pick which access point 220 is their home access point, then request an access key, such as a password, for access to access point 220.

Figure 8:
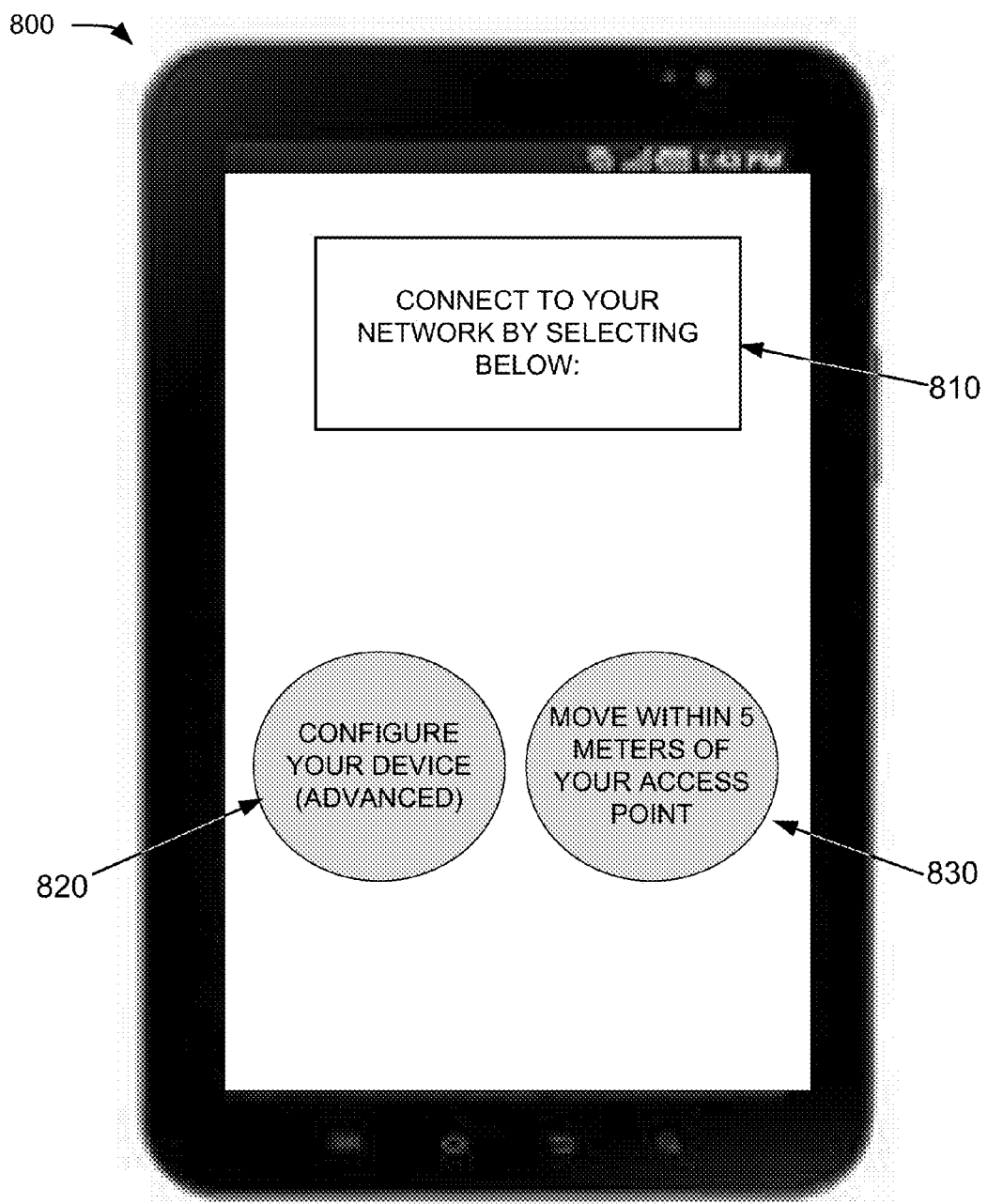
FIGS. 8-13 are diagrams of example user interfaces according to an implementation.

FIG. 8 is an example user interface that can be displayed for prompting for an access key according to an implementation. In one implementation, access point 220 upon discovering wireless device 210 can send a message to wireless device 210 requesting how the user, of wireless device 210, would like to connect to network 230. For example, a message 810, in a user interface 800, can be sent requesting the user of wireless device 210 to select a method of connecting to network 230. The methods can include configuring wireless device 210 with a SSID and/or password, if known, by selecting an advanced method via button 820, or configuring wireless device 210 by moving wireless device 210 to within a predetermined distance (e.g., first threshold distance 710) from access point 220 by selecting a proximity method via button 830.

Returning to FIG. 6, process 600 may include receiving user input (block 620). In one implementation, access point 220 may receive user input by receiving signals from wireless device 210, where wireless device 210 receives user input then sends signals to access point 220 to relay the user input. For example, wireless device 210 can provide a user interface, the user can interact with the user interface to input information, such as selecting the SSID for access point 220 and entering an access key (e.g., password). Wireless device 210 can convert the user's input into a signal that wireless device 210 can send to access point 220, and access point 220 can receive the signal from wireless device 210.

Process 600 may include determining whether the access key is correct (block 625). In one implementation, access point 220 may compare the access key entered to a stored access key on access point 220. If the access key is correct (block 625—YES), then access to network 230 can be granted (block 630). For example, access key can a WEP password or other type of password. If the access key is either not correct or not entered (block 625—NO), then access to network 230 can be achieved through other ways. In one implementation, access point 220 access can be achieved through distance sensitivity.

Process 600 may include determining whether the distance between access point 220 and wireless device 210 is less than a second threshold distance "B" (block 635). For example, access point 220 can measure a distance between access point 220 and wireless device 210 and can compare the distance with a second threshold distance.

Figure 9:
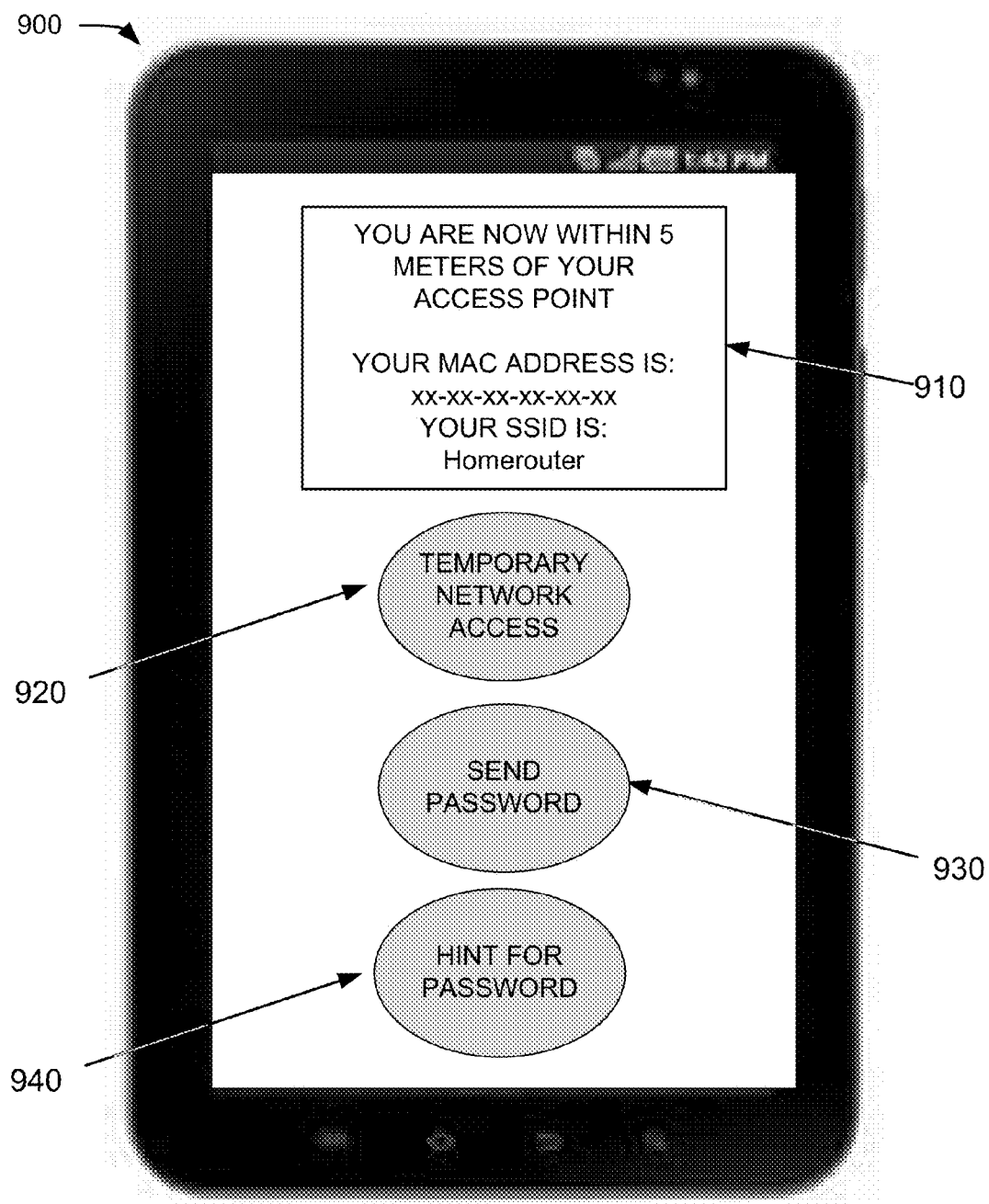

FIG. 9 illustrates an example user interface 900 that can be displayed to provide information, as well as other options, once wireless device 210 is within the second area 740 between the first threshold distance 710 and the second threshold distance 720. In one implementation, the example user interface 900 can be displayed by wireless device 210 when wireless device 210 is within the second area 740. User interface 900 can include a message 910 which identifies the distance, MAC address, and SSID, for example. Additionally or alternatively, user interface 900 may include options, such as temporary network access 920, password sent via email 930, or a hint for a password 940.

The option of temporary network access 920 can include allowing access to network 230, through access point 220, for a fixed amount of time, where temporary network access can be given without a password or other security measure. In one implementation, temporary network access 920 can be limited to downloading data without the ability to upload data.

The option of sending a password 930 can include sending via an email, a text message, and/or a phone call with a recorded message with a preset password from access point 220 to a preset email address, text number, or phone number. By providing the password, access could be achieved without requiring access point 220 to allow for access without the password.

In one implementation, an email address can be entered for password recovery during access point 220 set up, and upon selection of the option of a password sent via email 930, access point 220 can send an email with the password, and optionally the MAC address and/or SSID to the email address. Additionally, wireless device 210 can be given access to network 230 for the purpose of receiving the email from the access point 220. For example, limited network access to the email server, but not for data uploading or web surfing, can be available if the option of password via email 930 is selected.

The option of hint for a password 940 can include providing preset hints on a user interface that the user can preset to assist in password entry. In one implementation, the user can preset hints during access point 220 set up, where the hints can be specific to the user such that only the user would be able to find the password based on the hints.

Returning to FIG. 6, process 600 may include sending a message (block 640) if wireless device 210 is not beyond the second threshold distance 720 of access point 220 (block 635—NO). In one implementation, access point 220 can send a message, to wireless device 210, indicating that wireless device 210 is outside the second threshold distance 720, so that a user of wireless device 210 can move wireless device 210 closer to access point 220 to grant access to network 230. In another implementation, access point 220 can send a message to wireless device 210 with a message indicating the distance between access point 220 and wireless device 210, and can update the message on a time or distance basis. For example, every 10 seconds, or every change in distance between access point 220 and wireless device 210 of greater than one meter, can trigger a new message indicating the distance between access point 220 and wireless network 210 to be sent until wireless device 210 is within the second threshold distance 720.

Process 600 may include determining whether questions are to be used for network access (block 645). Network access via questions can be a configurable option of access point 220. For example, access point 220 may provide options during access point 220 set up, where the administrator of access point 220 can select whether questions for access can be used. In one implementation, questions may be used for security or authentication purposes. For example, even on low security networks, restriction to access by neighbors and others in close proximity may be desired for privacy, security, or other reasons. In one implementation, questions to confirm identity may be used. In another implementation, questions may not be selected to be asked (block 645—NO) and can lead to access being granted (block 675).

Figure 10:
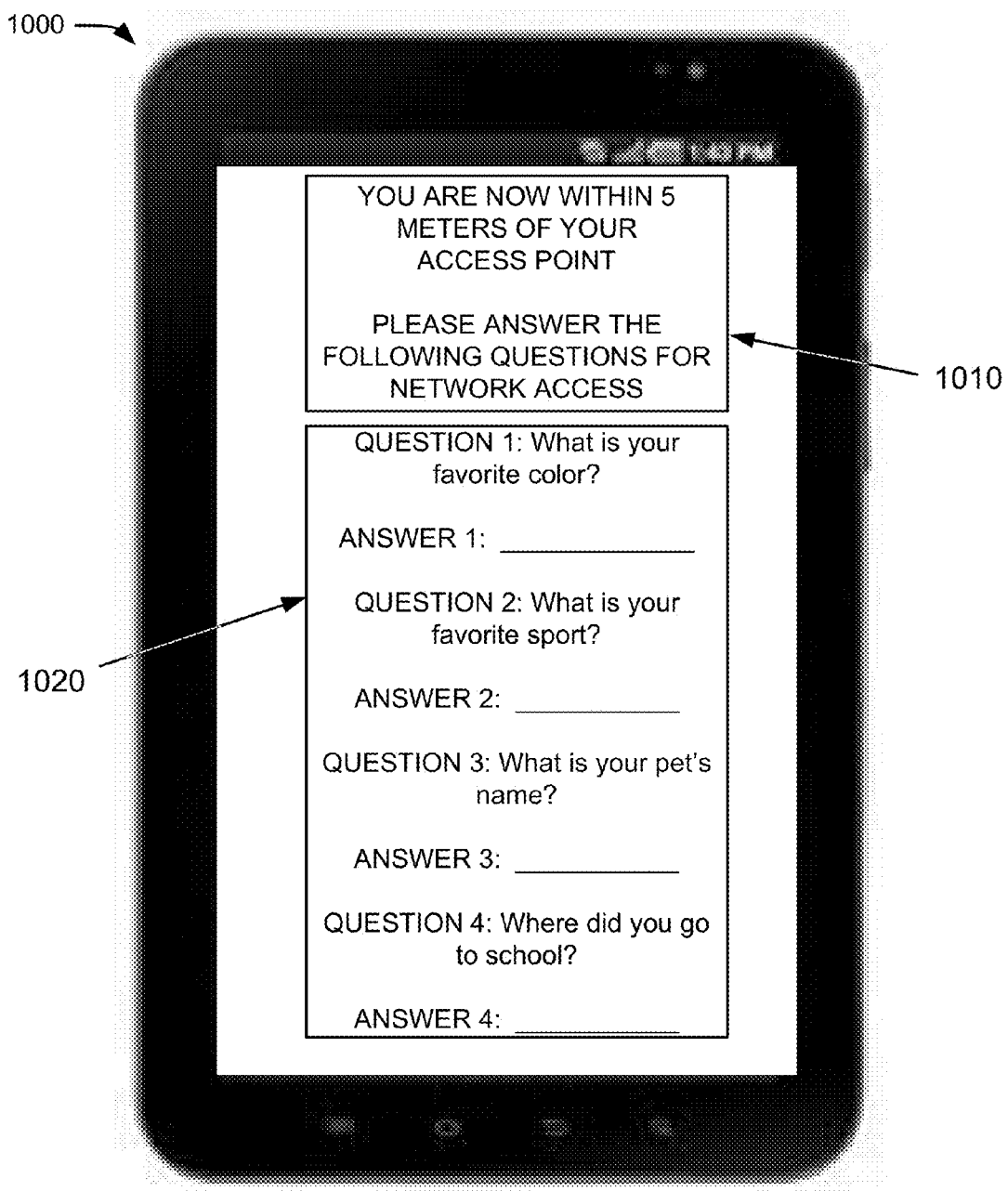

FIG. 10 illustrates an example user interface 1000 that can be used to provide information, as well as other options, once wireless device 210 is within a predetermined area, such as the first threshold distance 710 or the second threshold distance 720. In one implementation, the example user interface 1000 can indicate that wireless device 210 is within second distance 720 as message 1010. In one implementation, the example user interface 1000 can present questions 1020, which when answered correctly, can grant network access by access point 220.

Returning to FIG. 6, process 600 may include sending questions (block 650) from access point 220 to wireless device 210 if questions are to be used (block 645—YES). In one implementation, questions, such as personal questions regarding favorite items, places, or people can be used. For example, questions, such as favorite color, favorite sport, pet's name, school's name, etc. can be sent via access point 220 to wireless device 210, such as questions 1020 in FIG. 10.

Process 600 may include receiving answers (block 655). In one implementation, answers can be received by access point 220 from wireless device 210. For example, a user can enter answers in a user interface on wireless device 210, and wireless device 210 can send answers to access point 220. In one implementation, questions and answers may be entered into memory, such as main memory 315 of access point 220 during access point set up, for example, and stored in access point 220 for future use by access point 220. For example, during access point set up, software associated with access point 220 can assist in setting up questions (or other set up configurations, such as threshold distances) for later access.

Process 600 may include determining whether answers received are correct (block 660). In one implementation, answers can be received by access point 220 from wireless device 210. Access point 220 can receive answers and can determine whether the answers received are correct (in that the answers match previously entered answers stored in access point 220). For example, questions and answers can be input, stored, and processed by one or more components of access point 220, such as input port 310, and controller 340 respectively. Controller 340 can be used to compare answers provided by input port 310 with answers stored by controller 340, for example.

Process 600 may grant access to network 230 (block 675), if the answers provided are correct (block 660—YES). Access to network 230 in response to one or more correct answers can be unlimited permanent access, temporary access, or limited access. For example, if the user of wireless device 210 is able to get 4 questions correct out of 4 questions asked, then permanent access for wireless device 210 can be allowed; however, if only 3 questions are answered correctly, temporary access for wireless device 210 can be allowed; and if only 2 questions (or fewer) are answered correctly, limited access for wireless device 210 can be allowed.

In one implementation, permanent access could allow wireless device 210 to have access to network 230 at any time wireless device 210 is within range of access point 220. Additionally, or alternatively, temporary access could allow wireless device 210 to access network 230 for a specific period of time, such as 24 hours, after which access would be denied. Additionally or alternatively, limited access could allow wireless device 210 to have access to downloading actions, such as downloading emails. Additionally, or alternatively, permanent, temporary, or limited access can be limited to downloading of data without the ability to upload data, or any other limitation that can be implemented by access point 220.

Figure 11:
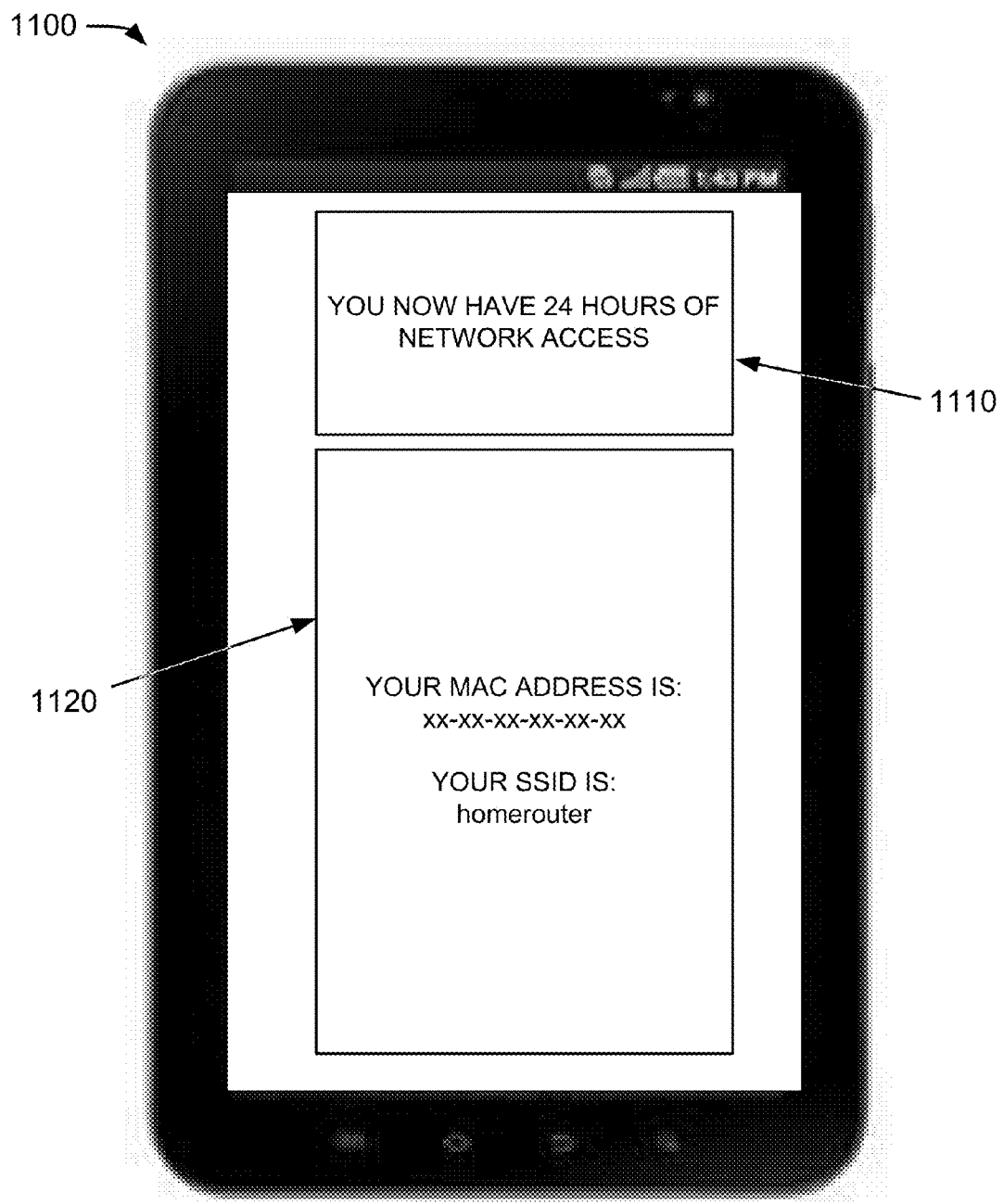

FIG. 11 illustrates an example user interface 1100 that can be presented to provide an access message 1110 and an access point information message 1120. In one implementation, access message 1110 can indicate the specific period of time that network access has been granted. Additionally, or alternatively, user interface 1100 may identify limitations on network access, such as allowing only downloading of data without the ability to upload data. In one implementation, access point information message 1120 can provide the MAC address and SSID for access point 220 or other information regarding access point 220 or network 230. For example, the access point information message 1120 can include a MAC address, a SSID, a password, instructions for access point 220 set up, or instructions for granting access to network 230.

Returning to FIG. 6, process 600 may include determining whether a limit has been reached (block 665), if the answers provided are not correct (block 660—NO). In one implementation, if one or more questions is not answered correctly (block 660—NO), then a new opportunity to answer questions can be provided until a limit in the number of opportunities or a time limit is reached. For example, a limit of 3 rounds of questions or a time limit of 5 minutes can be provided.

Figure 12:
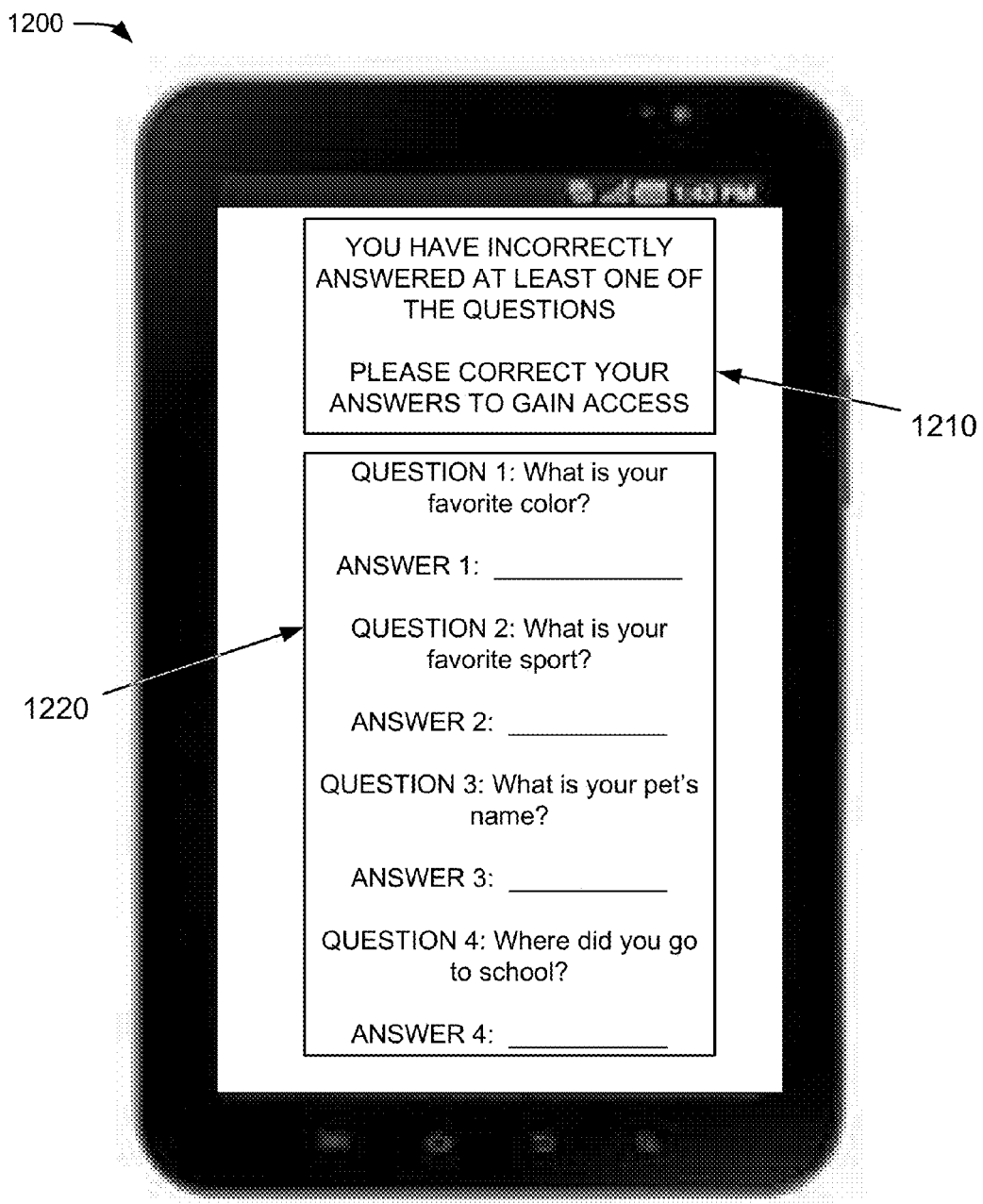

FIG. 12 illustrates an example user interface 1200 that can be presented to provide a question status message 1210 and a replacement set of questions 1220. In one implementation, the question status message 1210 can indicate that at least one of the questions was answered incorrectly, and an opportunity to answer replacement questions can be provided. In one implementation, the same questions, different questions, or a combination of the same and different questions can be provided in the replacement set of questions 1220.

Returning to FIG. 6, process 600 may also include sending a message (block 640), if the limit is not reached (block 665—NO). For example, the message can include the number of attempts remaining, the answers that were incorrect, the amount of time remaining, etc.

Process 600 may include denying access (block 670), if the limit is reached (block 665—YES). In one implementation, after the limit is reached, access can be denied. For example, after determining that answers have been incorrect for 3 rounds of questions or after 5 minutes have elapsed, access can be denied.

Additionally, or alternatively, process 600 can be reset to restart process 600. In an implementation, process 600 can be reset after access is denied (block 670) and/or after sending a message (block 640). In an implementation, process 600 can reset after a fixed amount of time, such as 5 minutes, where wireless device 210 can re-engage access point 220 (block 601). In an implementation, a reset button can be provided on wireless device 210 or access point 220, which can reset process 600 by manually resetting process 600. In an implementation, a proximity sensor on access point 220 can be used to allow wireless device 210 to be moved to a preset distance (or combination of preset distances) to reset process 600. For example, wireless device 210 can be moved beyond the second threshold distance 720 to cause access point 220 to reset process 600. Additionally, or alternatively, wireless device 210 can be moved away from access point 220 to a predetermined distance, and then brought closer to cause access point 220 to reset process 600. For example, wireless device 210 can be moved from the first threshold distance 710 to the second threshold distance 720 and then back to the first threshold distance 710 to reset process 600.

Figure 13:
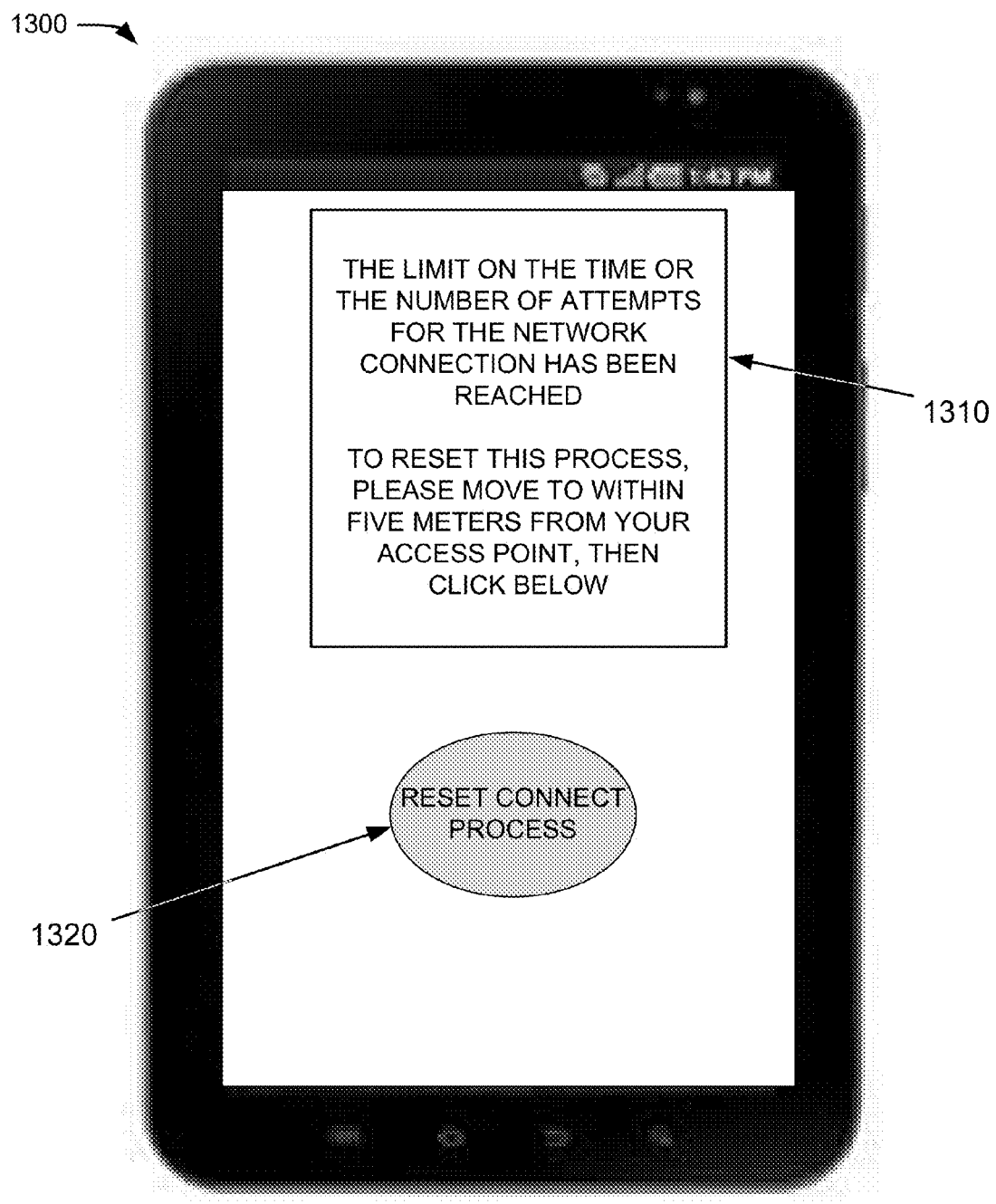
Figure 14:
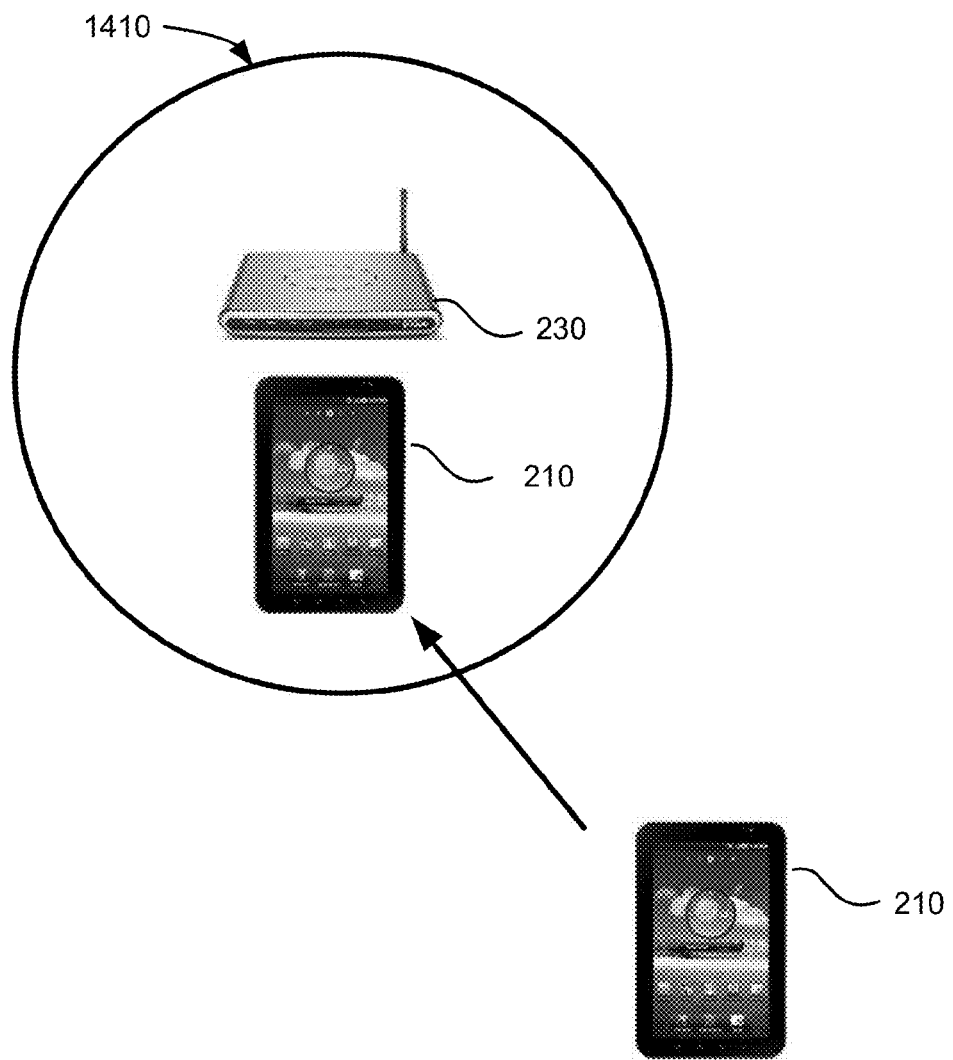
FIG. 14 is a diagram that illustrates a wireless device moving to within a threshold distance from an access point according to an implementation.

FIGS. 13 and 14 illustrate an implementation for resetting process 600. FIG. 13 illustrates an example user interface 1300 with a reset message 1310 and a reset button 1320 on a display of wireless device 210. In one implementation, after the limit is reached (block 665—YES), then reset message 1310 can be displayed indicating that the limit has been reached and requesting that wireless device 210 be brought within a predetermined distance (e.g., five meters) from access point before the reset button 1320 is selected.

As illustrated in FIG. 14, wireless device 210 can be moved closer to access point 220 from outside of a threshold distance 1410 to inside the threshold distance 1410. Upon crossing into an area defined by the threshold distance 1410, a reset can occur automatically or by selecting a reset button 1320, where the reset can restart process 600.

Additionally, process 600 may include providing access point configuration information. In one implementation, the access point configuration information can be provided during an early part of process 600, such as when prompting for an access key (block 615). In another implementation, the access point configuration information can be provided in a message, such as an email or text message, sent to an administrator. In one implementation, during access point 220 set up, an email address or text message number can be entered, where a message can be sent when requested by the administrator. For example, access point 220 can include a software or hardware mechanism to cause a message with access point configuration information to be sent. For example, a physical button can be provided, or a software feature, such as an automated or on demand message, can be used to access the access point configuration information.

Additionally, in one implementation, the access point configuration information can be modified. For example, an administrator can access and set or change the access point configuration information through wireless device 210 or another device connected to access point 220.

While a series of blocks has been described with respect to FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, at an access point and from a wireless device, a request for authorization to access a network via the access point;
    determining, by the access point, a distance between the access point and the wireless device;
    determining, by the access point, whether the distance is less than a first threshold distance;
    generating, by the access point, a first user interface presenting a first set of options for connecting to the network via the access point when the distance is less than the first threshold distance;
    generating, by the access point, a second user interface presenting a second set of options for connecting to the network via the access point when the distance is not less than the first threshold distance, wherein the second set of options includes an instruction to relocate the wireless device to within the first threshold distance;
    using selection of the first set of options for authorizing permanent, unlimited access for the wireless device to access the network via the access point, and
    using selection of the second set of options for authorizing at least one of temporary access or limited access for the wireless device to access the network via the access point.

2. The method of claim 1, wherein presenting the second set of options includes:
    sending security questions from the access point to the wireless device;
    receiving answers to the security questions;
    determining whether the answers correspond to stored answers stored by the access point; and providing access to the network via the access point only when each of the answers are determined to correspond to stored answers.

3. The method of claim 1, further comprising:
sending security questions from the access point to the wireless device;
receiving answers to the security questions;
determining whether the answers correspond to answers stored by the access point; and
providing a level of access to the network via the access point when fewer than all of the answers are determined to correspond to stored answers, wherein the level of access includes the at least one of temporary or limited access to the network.

4. The method of claim 1,
wherein the limited access includes an ability to download data from the network, and does not include an ability to upload data to the network.

5. The method of claim 1, wherein receiving the request for authorization to access the network includes:
receiving, by the access point, a signal requesting access from the wireless device; and
sending, by the access point, a message requesting entry of an access key.

6. The method of claim 1, further comprising:
receiving, by the access point, a request for access point configuration information including information regarding the first set of options, the second set of options, and the first threshold distance;
sending the access point configuration information to an administrator device connected to the access point, wherein the administrator device is the wireless device, another wireless device, or a wired network device;
receiving modifications to the access point configuration information from the administrator device; and
modifying the access point configuration information.

7. The method of claim 1, wherein determining the distance between the access point and the wireless device includes determining a radio signal strength from the access point to the wireless device and calculating the distance based upon the radio signal strength.

8. The method of claim 1, further comprising:
using selection of the first set of options for sending a message via email, text message, or phone call to an administrator of the access point, wherein the message includes authorization information including a MAC address, a SSID, and/or a password for the access point.

9. A device, comprising:
a processor configured to:
receive a request for authorization to access a network via the device from a wireless device;
determine a radio signal strength between the device and the wireless device;
calculate a current distance based upon the radio signal strength;
compare the current distance to a threshold distance;
generate a first set of options to access the network via the device when the current distance is less than the threshold distance,
generate a second set of options to access the network via the device when the distance is more than the threshold distance, wherein the second set of options includes an instruction to relocate the device to within a specified distance from the device,
use a selection of the first set of options to grant permanent, unlimited access for the wireless device to access the network via the device, and
use a selection of the second set of options to grant temporary, unlimited access for the wireless device to access the network via the device, or grant permanent, limited access for the wireless device to access the network via the device.

10. The device of claim 9, wherein the processor further:
sends security questions to the wireless device;
receives answers to the security questions from the wireless device;
determines whether the answers correspond to previously stored answers stored on the device; and
uses selection of the second set of options to grant access to the network, via the device, only when each of the answers are determined to correspond to the previously stored answers.

11. The device of claim 9, wherein the processor further:
sends security questions to the wireless device;
receives answers to the security questions from the wireless device;
determines whether the answers correspond to previously stored answers stored on the device; and
uses selection of the second set of options to grant access to the network via the device when fewer than all of the answers are determined to correspond to the previously stored answers.

12. The device of claim 9, wherein the processor further:
sends a message requesting an access key.

13. The device of claim 9, wherein the processor further:
uses selection of the first set of options to grant access to the network by sending a message via email, text message, or phone call to an administrator of the device, wherein the message includes authorization information including a MAC address, a SSID, and/or a password for the device.

14. The device of claim 9, where the device is a wireless access point.

15. A system, comprising:
an access point device configured to:
receive a request for authorization to access a network through the access point device from a wireless device;
calculate, for the wireless device, a distance to the access point device based upon a radio signal strength associated with the request; and
compare the distance to a first threshold distance;
wherein, when the distance is less than the first threshold distance, the access point device is configured to provide access to the network;
wherein, when the distance is not less than the first threshold distance and is less than a second threshold distance, the access point device is configured to:
send a plurality of security questions to the wireless device;
receive answers responsive to the plurality of security questions;
determine the received answers that correspond to a plurality of stored answers at the access point device; and
provide temporary or limited access to the network when fewer than all of the received answers are determined to correspond to the plurality of stored answers; and
wherein, when the distance is not less than the second threshold distance and is within a range of the access point, the access point device is configured to:

send, to the wireless device, a message including an instruction to relocate the wireless device to within a specified distance from the access point device.

16. The system of claim 15, wherein, when the distance is less than the first threshold distance, the access point device is configured to provide access to the network, and the access point device is configured to:
  authorize access for the wireless device to access the network; or
  send a message via email, text message, or phone call to an administrator of the access point device, wherein the message includes authorization information including a MAC address, a SSID, and/or a password for the access point device.

* * * * *